United States Patent [19]
Feller

[11] 4,304,127
[45] Dec. 8, 1981

[54] MEASUREMENT OF DELIVERED THERMAL UNITS

[75] Inventor: Murray F. Feller, Dunnellon, Fla.

[73] Assignee: Wilgood Corporation, Jacksonville, Fla.

[21] Appl. No.: 53,364

[22] Filed: Jun. 29, 1979

[51] Int. Cl.³ .......................................... G01K 17/10
[52] U.S. Cl. .................................................. 73/193 R
[58] Field of Search .................................. 73/204, 193

[56] References Cited

U.S. PATENT DOCUMENTS

| | | | |
|---|---|---|---|
| 2,329,813 | 9/1943 | Amsler | 73/193 |
| 2,931,222 | 4/1960 | Noldge | 73/193 |
| 2,972,885 | 2/1961 | Laub | 73/204 |
| 3,085,431 | 4/1963 | Yerman et al. | 73/204 |
| 3,648,518 | 3/1972 | Hans | 73/204 |
| 3,869,914 | 3/1975 | Koehler et al. | 73/190 |
| 4,036,051 | 7/1977 | Fell et al. | 73/193 |
| 4,043,195 | 8/1977 | Hunting | 73/204 |

FOREIGN PATENT DOCUMENTS

| | | | |
|---|---|---|---|
| 626366 | 4/1963 | Belgium | 73/193 |
| 1191627 | 5/1970 | United Kingdom | 73/193 |

Primary Examiner—Herbert Goldstein

[57] ABSTRACT

Apparatus and a method are described for measuring heating and/or cooling of air or other fluid that occurs between an inlet and an outlet, one being a low-temperature passage and the other being a high-temperature passage. Heat is supplied to a temperature sensor in the low-temperature passages sufficient to raise that sensor to the temperature sensed in the high-temperature passage where the sensor of the low-temperature passage is cooled both by the fluid temperature and its mass-flow rate, and the supplied heat is measured.

19 Claims, 5 Drawing Figures

MEASUREMENT OF DELIVERED THERMAL UNITS

The present invention relates to methods and apparatus for measuring heat absorbed by a fluid or released by a fluid in passing from an inlet passage to an outlet passage.

The performance of a heating or cooling system for a home (for example) is of interest and concern to manufacturers, builders and residents. Particularly, there is growing interest in evaluating the performance of solar-heated houses.

Heat delivered by a central furnace or a solar heater to the living space of a home can be measured by sensing the temperatures of the circulating air or hot water at the inlet and the return of the system, measuring the mass-flow rate, and multiplying the temperature difference by the mass of fluid that is cooled in passing through the living space. In an air conditioning system, the same procedure can be used to measure the heat extracted in advance from circulating air or water that is then warmed in passing through the living space. A simpler approach to evaluating the performance of circulating-air heating or cooling systems is to measure the inlet and outlet temperatures and to use an estimate of the mass-flow rate in computing the BTU units provided by the heating or cooling system. (Where the term "BTUs" is used herein, it is intended to represent heat units in any system of measurements). Use of such estimates can result in gross inaccuracies. The provision of discrete devices for measuring the flow rate and for performing the necessary multiplication represent cost factors and they complicate the measurement apparatus. Where the rate of heat-unit transfer is to be determined, a timing function is also to be performed.

SUMMARY OF THE INVENTION

The method and apparatus described below and represented in the accompanying drawings are illustrative, and are discussed in relation to heating or to heating and cooling of living space by means of a circulating air system. Clearly many applications of the broad concepts are possible.

As related to a circulating-air heating system or an air-conditioning system, a temperature sensor is located in the air inlet and in the air outlet. In the case of a heating system, the outlet is the low-temperature passage, while the inlet is the low-temperature passage in an air-conditioning system. A very small resistor serving as an electrical heater is assembled to the low-temperature sensor, and this heater is energized to raise the temperature of the low-temperature sensor in accordance with the temperature of the high-temperature sensor or, more specifically, to match that temperature. A feed-back circuit automatically controls this energization of the heating resistor. The unit consisting of the low-temperature sensor and the heating resistor is cooled only by the combined effects of the lower temperature of the air than the sensor/heater unit and by the flow-rate of the air that surrounds that unit. The heat exchange characteristics of the sensor/heater unit enable it to respond proportionally to changes in the specific heat content of the fluid, due both to changes of inlet/outlet temperature difference and the mass-flow rate. The approximation can readily be made accurate over a narrow range of flow rates and with special attention it can be made accurate over a wide range of flow rates. Accordingly, the amount and rate of electrical energy supplied to the heater represents the amount and rate of heater-units provided by the circulating-air heating or cooling system. The amount of energy that is supplied to the heating resistor is miniscule compared to that of the heating system or the air-conditioning system to be monitored, because only a tiny sample of the air in the low-temperature duct is subjected to heat-exchange exposure to the sensor/heater unit. Measuring the heat supplied to the electrical heating element accumulated over a long time interval gives a measurement of the aggregate number of heat-units provided by the heating or cooling system over the time interval. Measuring the rate of electrical energy supplied to the heating resistor provides a measurement of the rate that heat-units are provided.

Accordingly, it is an object of the invention to provide a novel method and apparatus for measuring the rate of heat transfer, and the aggregate amount of heat transferred over a prolonged period of time, between a fluid inlet and a fluid outlet connected to a space to be heated or cooled by the fluid. A more specific object of the invention resides in a novel method and apparatus for measuring heat transfer without measuring the fluid flow rate or the fluid temperature in the low-temperature passage, but in which both of those factors are resolved in providing the desired measurement. Still further, it is an object of the invention to provide such a system that yields output readily amenable to digital evaluation.

Various alternatives are described below for providing the feedback regulated energization to the heating resistor assembled to the low-temperature sensor. In one approach, the current is regulated at a steady-state level representing the rate of BTUs transferred to or from the living space by the circulating air. No timing function is needed in making heat-rate measurements. However, since the heat developed by the heating resistor is proportional to the square of the resistor current, it becomes necessary to perform a squaring computation where a resistor is used whose resistance is constant despite temperature changes. This could be avoided if a resistor were used whose resistance decreases as the inverse-square of the temperature with reasonable accuracy. Obtaining such a resistor is a problem.

In a second approach, the heating resistor is subjected to a rapid series of current bursts of constant amplitude in maintaining its associated sensor at the temperature of the high-temperature sensor. There is a slight oscillation of temperature above and below the desired temperature, but the deviation is held very low by use of high-gain amplifiers that are inexpensive and readily available, and by minimizing the mass and thermal inertia of the heater/sensor unit. The pulse-width can be allowed to vary or it can be held constant, and in either case the total on-time of energization (the aggregate current flow) is directly proportional to the heat transfer to or from the air in the living space. The pulse repetition rate and the time between pulses are factors that become adjusted automatically to be consistent with the on-time of resistor energization which is the controlling factor. This system involving pulsed energization of the resistor offers advantages of simplicity and low cost in deriving a digital read-out of the aggregate number of heating or cooling BTUs being measured.

The same apparatus that measures BTUs delivered by a furnace or solar heater when it is in operation is also operable to measure cooling BTUs delivered by an air conditioner using a common duct system and sensors in one of the illustrative embodiments, which represents further features of the invention. Common apparatus for measuring both heating and cooling occurring in a single system is also involved in my copending application Ser. No. 958,701 filed Nov. 8, 1978, now U.S. Pat. No. 4,245,501.

The nature of the invention including the foregoing and other objects, features and advantages, will be more fully appreciated from the following detailed description of several illustrative embodiments which are shown in the accompanying drawings.

Figure 1:
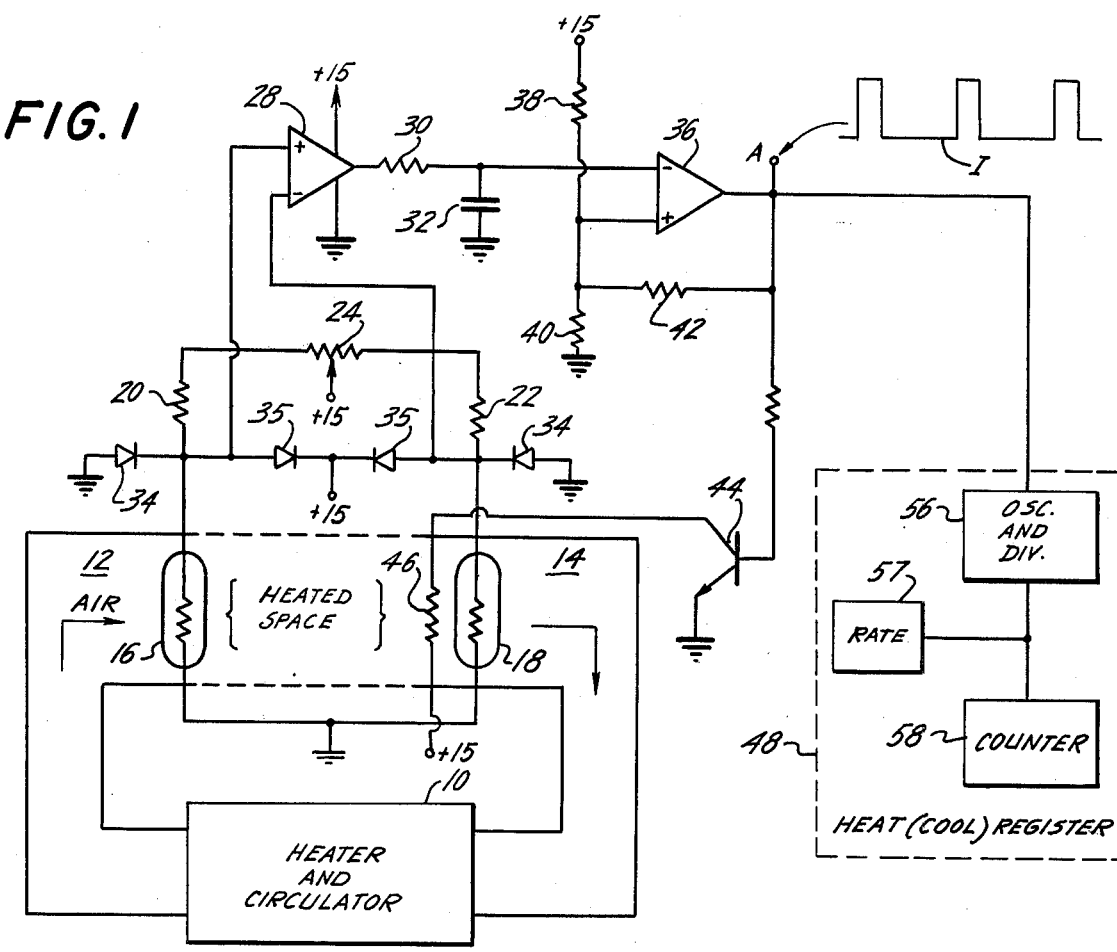
FIG. 1 is a combined diagram of a heating system and a circuit diagram of illustrative heat measurement apparatus.

In FIG. 1, there is shown an illustrative form of heating system, such as a central circulating hot-air heating system for a home. The system includes a heater such as a solar heater or a furnace and means for circulating the heated air here represented as a combined unit 10. The furnace or the solar heater and the circulator are normally turned on and off under control of a thermostat (not shown). An inlet duct 12 and an outlet duct 14 (here a return duct) direct the air to and from the living space to be heated. When considering a heating system, the inlet duct and the outlet duct may be termed the "high temperature passage" and the "low temperature passage", respectively. These terms also apply to corresponding parts of a circulating hot-water heating system.

Temperature sensors 16 and 18 are disposed in the inlet and outlet ducts, respectively. These are negative-thermal-coefficient thermistors in the illustrated apparatus, which are resistors whose electrical resistance varies inversely with temperature. The resistance variation with temperature of the thermistors, although non-linear, should match for the temperatures experienced in operation of the system. Thermistors 16 and 18 form two arms of a direct-current bridge. Resistors 20 and 22 are in the other two arms of the bridge. When thermistors 16 and 18 are identical, resistors 20 and 22 are intended to be equal. A trimmer potentiometer 24 is included for adjusting balance of the bridge, or for establishing a degree of imbalance if desired. The output terminals of the bridge are connected to the opposite (+) and (−) input terminals of operational amplifier 28.

Amplifier 28 is essentially a very high gain amplifier whose output switches abruptly from high to low or the reverse in dependence on the relative values of the voltages at its two input terminals. Resistor 30 and capacitor 32 at the output of amplifier 28 and diodes 34 and 35 at the output terminals of the bridge suppress noise or random electrical disturbances. "Op-amp" or high-gain amplifier 36 has its (−) input terminal connected to the output of operational amplifier 28. Units 28 and 36 in practice form sections of a dual integrated circuit, for example LM358. Resistor 42 is connected as a feedback resistor between the output and the (+) input of amplifier 36, and resistors 38 and 40 form a voltage divider to that (+) input. Resistors 38, 40 and 42 together with filter 30, 32 develop a latitude of hysteresis that provides additional protection against response to spurious "noise" signals. The output of amplifier 36 switches alternately from high to low and the reverse in response to the output of amplifier 28, subject to a brief time delay because of the hysteresis. Amplifier 36 causes switching transistor 44 to turn on and off, correspondingly energizing and deenergizing resistor 46.

Identical thermistors 16 and 18 are extremely small elements in ducts 12 and 14, self-heated alike to a tiny degree by the current of the bridge. They dissipate this heat substantially equally to their ambient air spaces. Resistor 46 is closely coupled to or in intimate heat-transfer relation to thermistor 18 in the low-temperature duct. Resistance to heat flow from resistor 46 to thermistor 18 is minimized by their being very close and by use of a good heat conductor filling voids between them. Sensor/resistor unit 18/46 is in passage 14, and is thus surrounded by the fluid in that passage.

It may be assumed that, at a given moment, thermistor 16 is warmer than thermistor 18. Since the resistance of thermistor 16 is lower than that of thermistor 18, the voltage at the (+) input of amplifier 28 is lower than that at its (−) input, causing its output to switch low. This output to (−) input of op-amp 36 shifts op-amp 36 output high, causing transistor 44 to conduct heavily. Current in heater 46 flows until the temperature sensed by thermistor 18 is slightly higher than that of thermistor 16. This change causes reversal of all the above effects, and transistor 44 interrupts the energization of heater 46. When the temperature of thermistor 18 drops below that of thermistor 16, another cycle of energizing and deenergizing heater 46 is started, repeating in an oscillatory manner. The "on" time of heater 46 and its "off" time are functions of the mass of unit 18/46, and the rate of heat dissipation of unit 18/46, and the "on" time is also a function of the heater current. The rate of heat dissipation is determined primarily by conduction to the ambient air which, in turn, is a function of the mass-rate of air flow. Self-heating of the thermistors due to the current in the bridge is a small factor and, where the units are identical, self-heating of the thermistors is of no consequence. The signal I appearing at output terminal A of amplifier 36 is a rectangular wave.

Unit 18/46 has a small but finite thermal mass. Also, there is inevitably some small lag in transmission of heat from heater 46 to thermistor 18 when the heater is energized. Those factors plus the hysteresis characteristic of amplifier 36 cause energizing current in heater 46 to "overshoot," that is, to flow beyond the theoretical instant at which enough heat has been supplied for the temperatures of thermistors 16 and 18 to match. Resistor 46 has a thermal coefficient of resistance of essentially zero. The rate at which heat is developed in resistor 46 is determined by the current supplied to it, constant current and voltage in this example. The various factors of the system are proportioned by design and adjustment so that the cycling process can occur under the most severe conditions for which the apparatus is intended, when the temperature difference between the inlet and outlet ducts is greatest and when the mass-rate of air flow is highest. The heat-measurement apparatus may be designed for a particular air velocity, and in that case it inherently provides compensation for random variations and deviation from the prescribed velocity. The heat-measurement apparatus is also useful for a variety of heating systems having widely different air velocities.

Under extreme conditions of a large difference between the inlet and outlet air temperatures and with high air velocity, it takes a relatively long time for the energized heater 46 to overcome the loss-of-heat from the unit 18/46. Moreover, the overshoot tends to be small. At a point, heater 46 is deenergized. The cool air current rapidly alters the state of unit 18/46, once again to start the heating phase of resistor 46. On the other hand, when the conditions are moderate, i.e. when the temperature difference between the ducts 12 and 14 is small and the air velocity is low, it takes but a short time for the unit 18/46 when energized to reach the deenergizing condition. The overshoot tends to be greater than occurs under the extreme conditions considered above. Under moderate conditions of temperature difference and air velocity, it takes a relatively long time for unit 18/46 when deenergized to return to its condition causing it to be energized once again. The cycle duration varies with the mass and other design details of unit 18/46 and on the various ranges of temperature differences and air velocities.

The high parts of wave I represent the times when heater 46 is energized. The ratio of the "on" time to the duration of an on-off cycle may be called the "duty cycle." A long duty cycle prevails when the heating system is supplying heat at a high rate. The aggregate "on" times represents the supplied heat. In a sense, heater 46 serves to condition the air sample to which unit 18/46 is directly exposed so that the mean temperature of the outlet air sample is restored to the inlet air temperature. This action represents a thermal-electric simulation of the inlet rate of heat supply at the outlet of the system.

In the described system, the rate of heat supply can be metered in properly calibrated apparatus by registering the "on" times of heater 46 during an hour or other unit of time, and storing the register reading. Many cycles of wave I occur during that interval. Alternatively or in addition, the total amount of delivered heat can be accumulated in a register over a long period of time such as a day, a month, or a heating season. A representation of the "on" times of heater 46 is accumulated in register 48 which is coupled to terminal A. The high intervals in the output of amplifier 36 determine counting of pulses from constant-frequency oscillator 56 by counter 58. The output of amplifier 36 can turn the oscillator on and off, or the output can be used to gate the output pulses from the oscillator to the counter, or the oscillator output may be coupled constantly to the input of counter 58 provided that the output of amplifier 36 is arranged to enable and disable the counter as a whole. These alternatives are diagrammatically represented in FIG. 1. It will be understood that the oscillator may operate at a relatively high frequency and its output may then be divided to an appropriate frequency for the counter, a much higher frequency than that of wave I.

Figure 2:
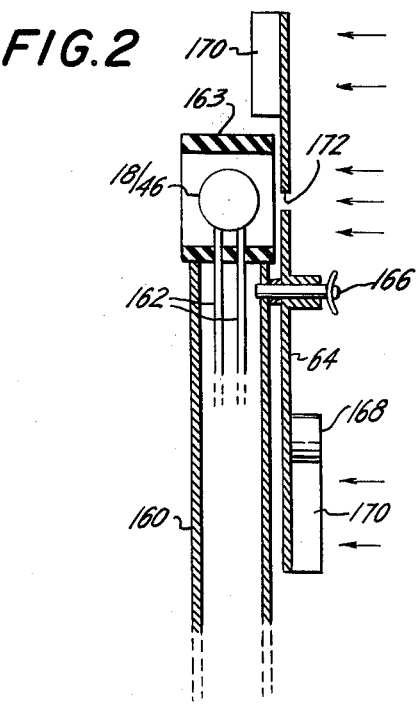
FIG. 2 is an enlarged cross-section at the plane 2—2 in FIG. 3 of structure for promoting linear heat exchange between a heat sensor in FIG. 1 and a variable-speed air stream.
Figure 3:
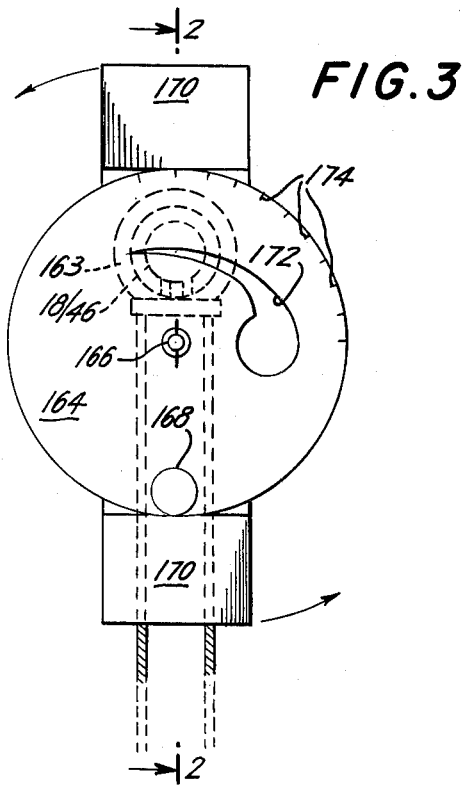
FIG. 3 shows the structure of FIG. 2 as viewed from the right.

It has been indicated in the course of describing FIG. 1 that the "on" times of the heater 46 will be longer both for greater differences of temperature between the inlet and the outlet of the heating system, and for faster air movement. A finned heat exchanger may be included in unit 18/46 for enhancing the proportionality of heat dissipation and mass-rate of air flow. Nevertheless, where a wide range of air velocities is encountered, the amount of heat taken by the air from unit 18/46 at any given temperature difference between the unit and the air does not increase in proportion to increases of mass-rate of air flow. Where linear response over a wide range of air velocities is important, static or dynamic compensating arrangements can be used. Such arrangements increase the air velocity past unit 18/46 disproportionately in relation to increases of air velocity in the duct. For example, a vane that is deflected by the air stream to adjust itself or another vane in such manner as to increase air velocity at temperature sensor 18 may be used. FIGS. 2 and 3 illustrate one such arrangement.

In FIGS. 2 and 3, tube 160 extends from a wall of the outlet duct, supporting thermistor/heater unit 18/46 in the duct so as to be surrounded by the fluid therein. Tube 160 also contains wires 162 which extend through the wall of the air duct. A thin-wall shroud 163 (preferably made of a material of low specific heat) guides the air stream (represented by arrows in FIG. 2) past unit 18/46. Plate 164 is supported on pivot 166 which is fixed to tube 160. Plate 164 is biased by weight 168 to assume the vertical position as shown. A spring or a magnet can replace weight 168. Vanes 170 forming part of plate 164 cause the plate to shift counter-clockwise as viewed in FIG. 3 when there is air flow along the duct. An orifice 172 in plate 164 has a narrow portion aligned with unit 18/46 when the air velocity is a minimum. There is a progressive increase of the orifice size that is disposed opposite unit 18/46 as the duct air velocity increases. The air acts on vane 170 to cause progressive counter-clockwise shift of orifice 172 to dispose gradually larger orifice areas opposite unit 18/46. Scale markings 174 on plate 164 can be used as a calibrated or uncalibrated guide to manual adjustment of the blade in case the air velocity of a given installation is known and the air is moving at that velocity whenever the heating system is turned on. In that event weight 168 can be omitted and, instead, pivot 166 can be arranged to provide a firm degree of frictional retention to hold plate 164 in any fixed selected adjustment.

When there is an increase in the mass-rate of air flow past a heat source such as unit 18/46, of course the amount of heat dissipated increases. The increased dissipation may be an acceptable approximation of proportionality for a limited range of air velocities. In that case arrangements such as that of FIGS. 2 and 3 may be unnecessary, or a fixed orifice plate 164 may be used.

When the thermostat of a circulating hot-air system shuts off the flow of heated air, there is a possibility of a small error arising in the registered amount of heat. This may result from convection air currents at sensors 16 and 18 in the inlet and outlet ducts. That potential source of error can be eliminated in a number of ways. For example, while the aircirculating blower of the heating system is shut off, a coordinated switch in the circuit of register 48 can be arranged to suppress further entries of BTU-representing signals into counter 58. An alternative automatic shut-off is included in the embodiment of FIG. 4.

Figure 4:
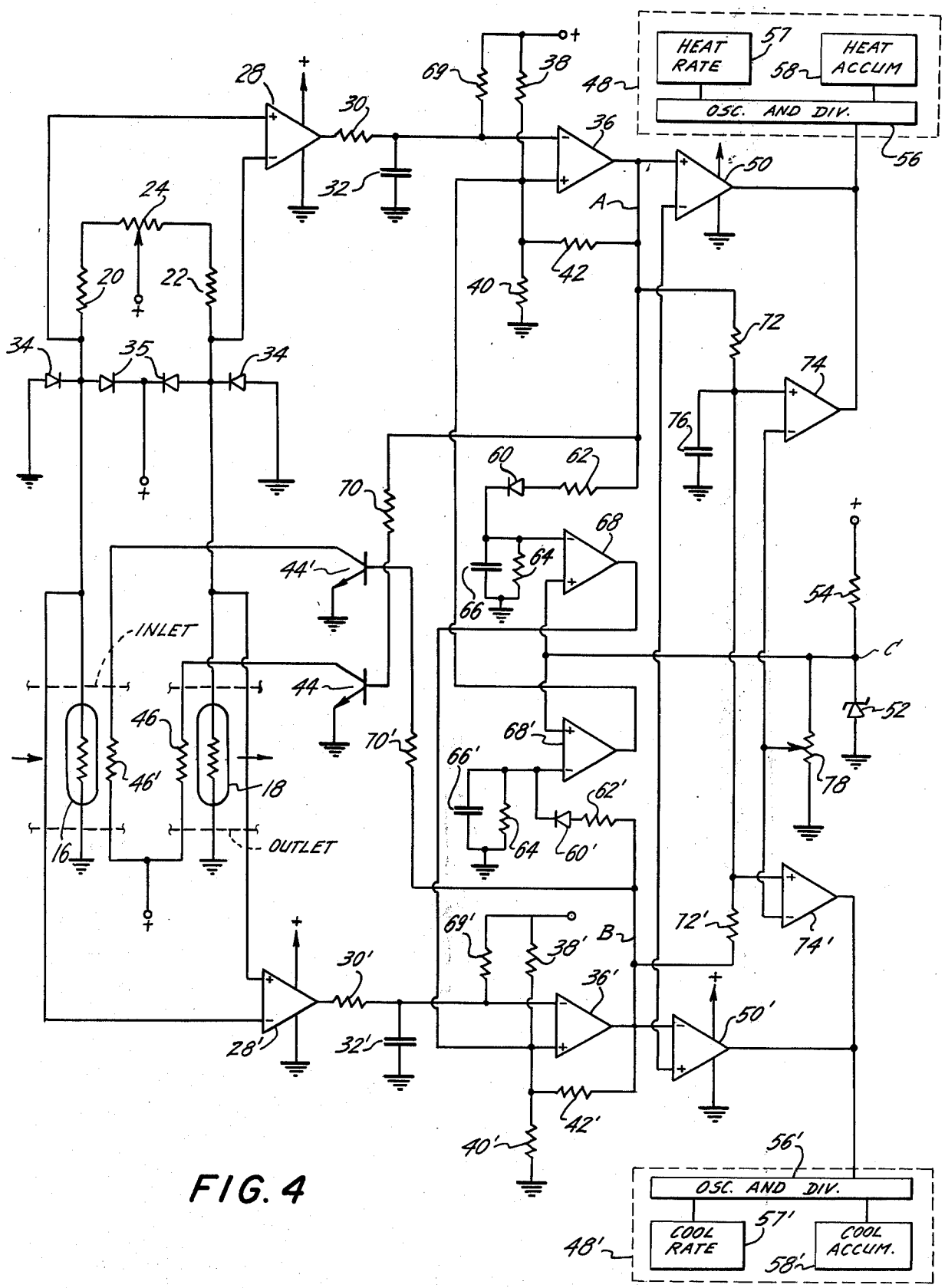
FIG. 4 is a wiring diagram of dual heat measurement apparatus incorporating FIG. 1. It includes provision for separately and automatically measuring the heating BTU's and the cooling BTU's of a combined heating and air conditioning system.

The heat-measurement apparatus of FIG. 4 includes the apparatus of FIGS. 1–3, but adds a number of features. The same inlet and outlet temperature/air-flow sensing means that controls the BTU-register of the heating means is also used in FIG. 4 to control the BTU-register of an air conditioning system wherein cooled air enters via the inlet and leaves somewhat warmer via the outlet. Whenever the "cool" register is in operation, the "heat" register is disabled automatically to suppress spurious entries, and vice versa, whenever the "heat" register is in operation, the "cool" register is disabled. Whenever the duty-cycle of both of the register-controlling signals is so short as to indicate interruption of the air flow, operation of both the "heat" and the "cool" registering apparatus is interrupted.

Portions of the circuit appearing in FIG. 4 as part of the "heat"-registering apparatus bear the same numbers as corresponding parts of FIG. 1. Corresponding components of the circuit appearing in FIG. 4 as part of the "cool"-registering circuit bear primed numbers corresponding to those of the "heat"-registering circuit. Their purpose and operation will be understood from the above discussion of FIG. 1. Unit 16/46' is identical to unit 18/46.

Signal A of FIG. 4 is the rectangular wave I of FIG. 1, representing delivered heat of the hot-air system. Signal B of FIG. 4 is also a rectangular wave, whose high intervals represent delivered cooling BTU's of an air conditioning system. Signal B controls switching transistor 44' to energize and deenergize heater 46' at the air inlet. In operation of the air conditioning system, thermistor 16 at the inlet of the system is exposed to a cooler air stream than thermistor 18 at the outlet of the system, whereas the cooler air stream of a heating system is at its outlet.

Signal B provides control input in three ways:

1. It switches transistor 44' on and off to control energization of heating resistor 46'. The resulting operation is the same in producing rectangular wave B for the cooling register as that described above for signal A and the heating register.

2. Signal B is also used as input to an automatic suppression circuit for the heat-registering part of the circuit. This includes a rectifier 60' in series with a small resistor 62' connected to parallel-connected resistor 64' and capacitor 66' which are returned to ground. The junction of diode 60' to resistor 64' and capacitor 66' provides a bias signal to the (−) input of comparator 68' whenever signal B appears, indicating that the air conditioning system is in operation. Because only a small resistor is in series with rectifier 60', capacitor 66 charges quickly when signal B appears. Comparators 68 and 68' are parts of a dual integrated circuit, such as LM393. The (+) input of comparator 68' has a bias voltage C provided at the junction of Zener diode 52 and resistor 54 which are connected in series between (+) and ground of the circuit. The output of comparator 68' is connected to the (+) input of operational amplifier 36. Whenever the signal at the (−) input of comparator 68' exceeds bias C, the (+) input of amplifier 36 is in effect shorted to ground and the output of amplifier 36 is locked "low." Resistor 69 of large value stabilizes the (−) input of amplifier 36 in this condition. Shorting the (+) input of amplifier 36 to ground blocks energization of heater 46 and wholly suppresses spurious operation of the "heat" channel. Resistor 70 in the output connection of op-amp 36 to transistor 44 precludes excess loading on the op-amp. At their output comparators 68,68' behave as a short when the (−) input goes high, as an open circuit when below (+). If no signal B appears, the output of comparator 68' has no effect on the (+) input of amplifier 36. Conversely, when signal A appears, if it exceeds the low level of Zener diode 52, comparator 68 locks the (+) input of amplifier 36' to ground. This avoids a spurious signal B by blocking energization of heater 44', and it prevents operation of the "cool" register.

3. Signal B is coupled through series resistor 72' to the (+) input of comparator 74'. Similarly signal A is coupled through resistor 72 to the (+) input of comparator 74. Comparators 74 and 74' may be a dual integrated circuit such as Type LM393. These (+) inputs are connected in common to capacitor 76, which has its opposite terminal grounded. The (−) inputs of comparators 74 and 74' are connected to bias potentiometer 78, to provide bias up to a maximum of bias C. Whenever either the heating system or the cooling system is in operation, a sufficient voltage develops across capacitor 76 to shift the output of comparators 74 and 74' from low to high. In the low condition of its output, each of these comparators is controlled by the bias at its (−) input to suppress rising pulses of wave A or B which otherwise would be coupled to the respective registers via comparators 50 and 50'. This disabling effect is removed when either of the pulsed d-c signals A and B, averaged by capacitor 76, exceeds a set minimum level. The result is that, while neither the heating system nor the cooling system is in operation, neither the "heat" register nor the "cool" register will receive entries. Otherwise spurious entries could result, caused for example by convection air currents at the sensors 16 and 18.

The circuits of FIGS. 1 and 4 yield square-wave output signals whose high excursions represent the heat-units transferred to or from the heated or air-conditioned space. The aggregate "on" times of each channel are directly proportional to the BTUs provided by the heating or air-conditioning system to the heat-exchange space which, in a home, is the living space. Assuming many oscillator waves occur during each "on" time of wave I, A or B, the "on" times are integrated by counting the pulses gated to a register during the "on" times. The readings of the rate-of-heating register 57 and the accumulated BTUs in register 58 must be calibrated in relation to the heat transferred by the volume of air flowing in the ducts, being proportionally larger for larger duct cross-sections.

Figure 5:
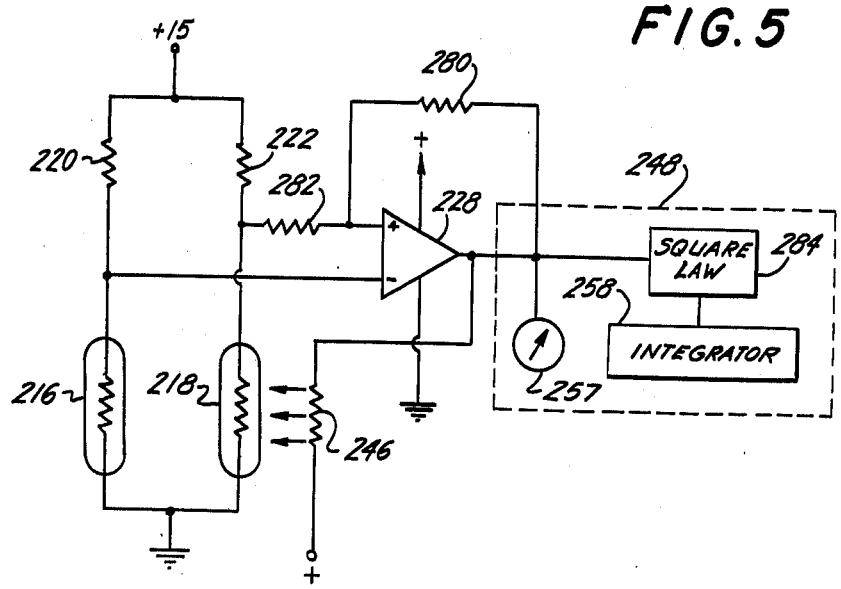
FIG. 5 is a modification of FIG. 1.

FIG. 5 shows a modification, where the output is a continuous signal whose magnitude represents the transferred or exchanged heat. In FIG. 5, the components bear numerals of the "200" series to designate corresponding components in FIG. 1. Thus, matched thermistors 216 and 218 correspond to thermistors 16 and 18, and so forth. Heating resistor 246 is closely coupled to thermistor 218 as described in the case of unit 18/46, and a suitable device can be used if necessary to impart the characteristic of unit 18/46 to unit 218/246 in response to varying conditions of heat-unit transfer, for example giving the same response to an air stream of a given mass-flow rate and temperature difference as to another air stream of twice the mass-flow rate and half the temperature difference. One form of such device is shown in FIGS. 2 and 3.

The output of the bridge comprising thermistors 216 and 218 and arms 220 and 222, is applied to the (+) and (−) inputs of op-amp 228 through an optional series resistor 282. Negative feedback resistor 280 is connected between the output of op-amp 228 and its (−) input, so that the output of op-amp 228 is a linear highly stable replica of its input. Heating resistor 246 normally has an essentially zero thermal coefficient of resistance, or constant resistance despite its own exposure to various temperatures.

The output of op-amp 228 will be a steady signal whose amplitude or deviation from a zero reference level represents the heat transferred to the space to be heated. However, the amplitude varies as the inverse square of the transferred heat. Thus, if the heat-unit transfer increases from one rate to double that rate, the amplitude of the output op-amp 228 only increases by 1.41. That results from the fact that, with a 1.41 increase in the signal amplitude, the heat developed by resistor 246 doubles.

Indicator 257 that represents the rate of heat-unit transfer to the heat-exchange space should have a scale calibration with an inverse-square characteristic. In the part of the registering apparatus 248 that is provided to accumulate the heat-unit transfer occurring over a long period of time, the accumulating register 258 should have a squaring circuit 284 at its input, to yield an input to register 258 that varies linearly with the rate of heat-unit transfer.

As a modification in the circuit of FIG. 5, it would be possible to substitute a different heating resistor for the resistor 246 having a constant resistance-versus-temperature characteristic. The substituted resistor would require a characteristic such that its resistance would decrease as the inverse square of the applied voltage, approximately the inverse square of the temperature changes. With such a change, the output signal amplitude of op-amp 228 would be linearly proportional to the transfer of heat-units to the heat-exchange space. With this change, the calibration of rate-of-transfer indicator 257 can have a linear scale, and squaring circuit 284 of FIG. 5 should be omitted. Resistors having a negative coefficient of resistance are known, even variable coefficients. However, obtaining a resistor having an inverse-square thermal coefficient of resistance is difficult. Hence the embodiment of FIG. 5 with a constant-resistance resistor 246 has its advantage.

The foregoing detailed description of several illustrative embodiments of the invention that evidence various aspects of the invention are naturally amenable to a range of modification and varied application. Therefore the invention should be construed broadly in accordance with its true spirit and scope.

What is claimed is:

1. In a system having an inlet passage, an outlet passage, a heat-exchange region between said inlet and outlet passages, and means for moving fluid successively through said inlet passage, said heat-exchange region and said outlet passage, whereby the temperature of the fluid tends to be low in the "low temperature" one of said passages compared to the fluid temperature in the "high temperature" other one of said passages, improved apparatus for gauging the heat units transferred between the fluid and the heat exchange region, said gauging apparatus including a temperature sensor disposed in the high-temperature passage, a sensor/resistor unit disposed in the low-temperature passage so as to be surrounded by the fluid therein, said sensor/resistor unit including a temperature sensor and a resistor in intimate heat-transfer relation to each other, a heat read-out, and means responsive to said sensors for (1) controlling the energization of said resistor to raise the temperature of the sensor of the low temperature passage so as to approximate the temperature of the high temperature passage and (2) for correspondingly providing input to said heat read-out, said sensor/resistor unit being proportioned for significant heat transfer to only a tiny sample of the fluid flowing in said low-temperature passage whereby the heater is energized as aforesaid by only a miniscule amount of energy compared to the total heat units transferred between the fluid and the heat exchange region.

2. Heat gauging apparatus as in claim 1 wherein the means responsive to said sensors includes (1) means for deriving variable signals representing the relationship of the temperatures of said sensors and (2) means for adjusting the level of energization of said heating resistor in dependence on said derived signals.

3. Heat gauging apparatus as in claim 1 wherein the means responsive to said sensors includes (1) means for deriving signals of opposite signs in dependence on the relationship of the temperatures of said sensors; and (2) switchable means for alternately supplying energy to said heating means and suspending such supply in dependence on the signs of said derived signals.

4. Heat gauging apparatus as in claim 3 wherein said switchable means is adapted to supply constant energy to said heating means whenever it is switched "on", whereby the aggregate "on" times of the switchable means represents the heat exchanged between the fluid and the heat exchange region.

5. Heat gauging means as in claim 3 wherein the thermal coefficient of resistance of said resistor is substantially zero and wherein said switchable means includes a constant voltage source and switching means controlled by said sensors for connecting said source to said resistor intermittently.

6. Heat gauging apparatus as in claim 1, wherein said sensors are thermistors forming parts of a bridge, and wherein said means responsive to said sensors includes at least one high gain amplifier having differential coupling to said thermistors at its input and having output coupling that controls energization of said electric heating means.

7. Heat gauging means as in claim 6 wherein the thermal coefficient of resistance of said resistor is substantially zero and wherein said energization controlling means includes a constant voltage source.

8. Heat gauging means as in claim 7 wherein said high gain amplifier is arranged to control energization of of said resistor for continuously raising the temperature of the sensor in the low-temperature passage close to but not above a prescribed relation to the sensor in the high-temperature passage.

9. Heat gauging means as in claim 7 wherein said high gain amplifier is arranged to control energization of said resistor for alternately exceeding slightly and falling below a prescribed relation to the sensor in the high-temperature passage.

10. Apparatus as in claim 1, wherein the means responsive to said sensors is adapted to provide continuous energization to said electric heating means when there is a temperature difference between the inlet and the outlet passages.

11. Apparatus as in claim 10, wherein the continuous energization means responsive to the sensors is adapted to apply varying voltage to the electric heating means, controlled for minimizing said temperature difference, and wherein the read-out includes registering means responsive to the square of the voltage applied to the electric heating means.

12. Apparatus as in claim 1, further including means responsive to said sensors for suppressing operation of said read-out when the input to the heating resistor would be less than a prescribed level.

13. Apparatus for gauging heat units exchanged by fluid that is moved from an inlet passage to a heat exchange region and thence to an outlet passage, whereby the temperature of the fluid tends to be low in the "low temperature" one of said passages compared to the fluid temperature in the "high temperature" other of said passages, said apparatus including two temperature sensors, one for each of said passages, said apparatus including dual channels each including heat read-out means, electric heating means for said sensors respectively and means for controlling energization of the respective heating means and for providing input to the respective heat read-out, all as aforesaid, for registering heat exchange both when the fluid flow provides heating and when it provides cooling, further including means in each channel rendered operative when its output exceeds a threshold for suppressing operation of at least the heat read-out of the other channel.

14. Apparatus for gauging the heat units exchanged by a fluid that is moved from an inlet passage to a heat exchange region and thence to an outlet passage, whereby the temperature of the fluid tends to be low in the "low temperature" one of said passages compared to the fluid temperature in the "high temperature" other of said passages, said apparatus including two temperature sensors, one for each of said passages, the sensor for the low-temperature passage having electric heating means, a heat read-out, and means responsive to said sensors for (1) controlling the energization of said electric heating means to raise the temperature of the sensor of the low temperature passage so as to approximate the temperature of the high temperature passage and (2) for correspondingly providing input to said heat read-out, said sensor in the low-temperature passage and said electric heating means constituting a unit, and wherein said unit has heat-exchange characteristics that cause substantial equal dissipation of heat due to changes in the mass-rate of fluid flow and due to changes in the difference in temperature between that of the low-temperature passage and that of the sensor in the low-temperature passage for representing the energy change of the fluid between the inlet and outlet passages.

15. Apparatus as in claim 14 wherein said unit comprises movable means responsive to fluid velocity in the low-temperature passage for adjusting the fluid velocity past the sensor of that unit for imparting said heat-exchange characteristics over a range of fluid velocities.

16. A method of gauging heat units exchanged between heat exchange means and a fluid that is moved from an inlet passage through a heat exchange region and thence to an outlet passage, including the steps of disposing a temperature sensor in the high-temperature one of said passages, disposing a sensor/resistor unit in the low-temperature one of said passages so as to be surrounded by the fluid therein, said sensor/resistor unit comprising a temperature sensor and a resistor in intimate heat-transfer relation to each other, detecting a difference that occurs at times in the response of said sensors, utilizing the detecting difference to determine the supply of energy to the resistor of said sensor/heat unit for maintaining the sensor of that unit at a close approximation of the temperature of the sensor in the high temperature passage, and indicating the energy thus supplied to the resistor as a representation of the heat exchanged in said heat-exchange region.

17. The method as in claim 16, wherein said sensor/resistor unit is very small in relation to said low-temperature passage so that only a small sample of the fluid in said low-temperature passage is subjected to significant heat-exchange exposure to said sensor/resistor unit.

18. A method for gauging the heat units provided by a fluid that is moved from an inlet passage to a heat exchange region and thence to an outlet passage, whereby the temperature of the fluid tends to be low in the "low temperature" one of said passages compared to the fluid temperature in the "high temperature" other of said passages, said apparatus including two temperature sensors, one for each of said passages, the sensor for the low-temperature passage having electric heating means, a heat read-out, and means responsive to said sensors for (1) controlling the energization of said electric heating means to raise the temperature of the sensor of the low temperature passage so as to approximate the temperature of the high temperature passage and (2) for correspondingly providing input to said heat read-out, the heated sensor in the low-temperature passage having characteristics causing it to respond proportionally to changes in heat content of the moved quantity of fluid independent of whether the changes of heat content are due to changes of temperature difference between the inlet and outlet passages or to changes in the rate of mass-flow of the fluid.

19. In a system having an inlet passage, an outlet passage, a heat exchange region between said inlet and outlet passages, and means for moving fluid successively through said inlet passage, said heat exchange region, and said outlet passage, whereby the temperature of the fluid tends to be lower in the "low temperature" one of said passages than in the other one of said passages, said means having operation-interrupting means, and apparatus for gauging heat units exchanged between said fluid and said heat exchange means, said gauging apparatus including a temperature sensor for each of said passages, a heating resistor in heat-transfer relation to the sensor in said low temperature passage, a heat read-out, and means responsive to said sensors for (1) controlling energization of said heating resistor to raise the temperature of the sensor of the low-temperature passage to approximate the temperature of said other one of said passages and (2) for correspondingly providing input to said heat read-out, said system including means for suppressing entry of said input into said heat read-out in coordination with interruption of the operation of said fluid-moving means.

* * * * *